United States Patent
Guhr

(10) Patent No.: US 8,118,698 B2
(45) Date of Patent: Feb. 21, 2012

(54) TENSIONER FOR AN ENDLESS DRIVE

(75) Inventor: Wolfgang Guhr, Grundau (DE)

(73) Assignee: Litens Automotive GmbH, Geinhausen (DE)

(*) Notice: Subject to any disclaimer, the term of this patent is extended or adjusted under 35 U.S.C. 154(b) by 584 days.

(21) Appl. No.: 12/296,602

(22) PCT Filed: Apr. 5, 2007

(86) PCT No.: PCT/EP2007/003113
§ 371 (c)(1),
(2), (4) Date: Oct. 9, 2008

(87) PCT Pub. No.: WO2007/118625
PCT Pub. Date: Oct. 25, 2007

(65) Prior Publication Data
US 2009/0181815 A1 Jul. 16, 2009

(30) Foreign Application Priority Data
Apr. 12, 2006 (DE) .......................... 10 2006 017 287

(51) Int. Cl.
*F16H 7/12* (2006.01)
(52) U.S. Cl. ....................................................... 474/135
(58) Field of Classification Search .................. 474/101, 474/109, 110, 133, 135
See application file for complete search history.

(56) References Cited

U.S. PATENT DOCUMENTS

| 4,473,362 A | 9/1984 | Thomey et al. |
|---|---|---|
| 4,583,962 A | 4/1986 | Bytzek |
| 4,689,037 A | 8/1987 | Bytzek |
| 4,698,049 A | 10/1987 | Bytzek et al. |
| 4,826,471 A | 5/1989 | Ushio |
| 4,938,734 A | 7/1990 | Green et al. |
| 4,983,145 A | 1/1991 | Hirai et al. |
| 5,011,460 A | 4/1991 | Ouchi et al. |
| 5,030,171 A | 7/1991 | Henderson |
| 5,083,983 A | 1/1992 | Hirai et al. |
| 5,195,932 A | 3/1993 | Hirai et al. |
| 5,312,302 A | 5/1994 | Yamamoto |

(Continued)

FOREIGN PATENT DOCUMENTS

DE 4010928 C2 10/1991

(Continued)

OTHER PUBLICATIONS

Notice of Opposition & Brief by Muhr & Bender KG filed in European Patent No. EP 2005029 (Notice of Opposition dated Apr. 6, 2011).

(Continued)

*Primary Examiner* — William E Dondero
(74) *Attorney, Agent, or Firm* — Millman IP

(57) ABSTRACT

The invention relates to a tensioner (1) for an endless drive, in particular of an internal combustion engine, wherein the tensioner has base part (2) and a tensioning part (3) which can rotate relative to the former, a spring element (11) which is arranged between the base part and the tensioning part (3) so as to impart a force, and a friction apparatus (13) which is provided between the spring element (11) and the base part or the tensioning part (3) and by way of which the relative movement between the base part (2) and the tensioning part (3) is damped. In order to improve a tensioner of the generic type in such that a simple construction is possible with satisfactory tensioning, it is proposed to arrange the friction apparatus (13) radially outside the spring element (11).

29 Claims, 2 Drawing Sheets

U.S. PATENT DOCUMENTS

Figure 1:
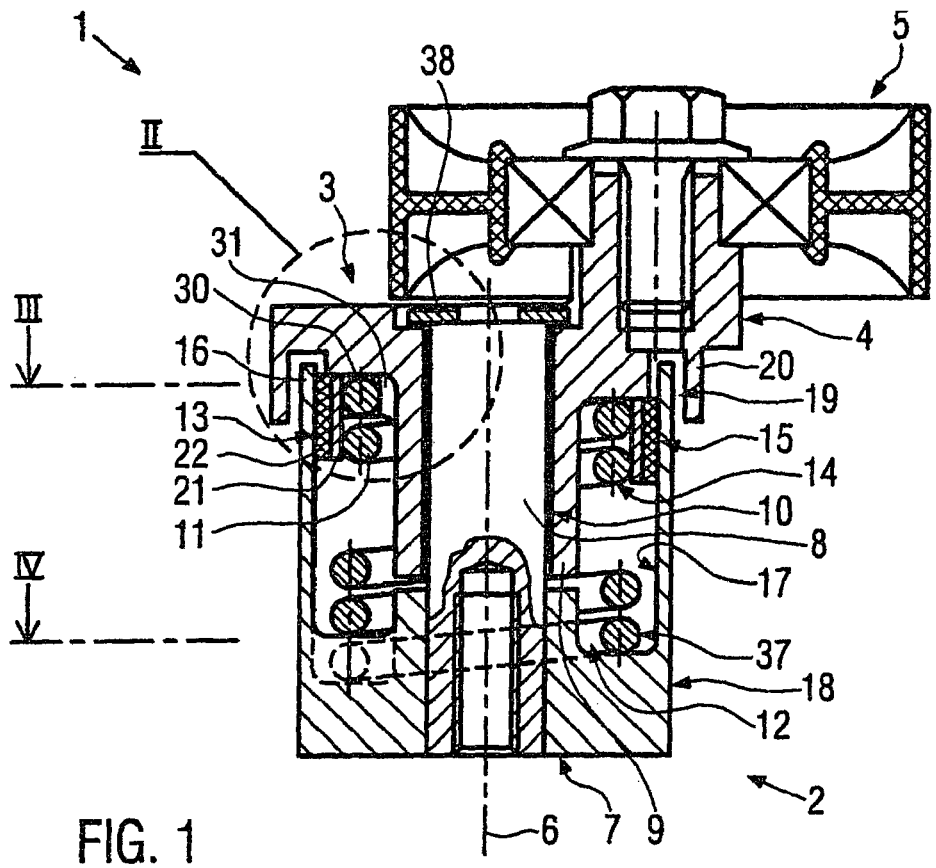

| | | | |
|---|---|---|---|
| 5,407,397 | A | 4/1995 | Foley |
| 5,478,285 | A | 12/1995 | Bakker |
| 5,647,813 | A | 7/1997 | Serkh |
| 5,803,849 | A | 9/1998 | Ayukawa |
| 5,967,919 | A | 10/1999 | Bakker |
| 6,004,235 | A | 12/1999 | Ohta et al. |
| 6,059,679 | A | 5/2000 | Tsutsui et al. |
| 6,264,578 | B1 | 7/2001 | Ayukawa |
| 6,422,963 | B2 | 7/2002 | Kurose |
| 6,497,632 | B2 | 12/2002 | Ayukawa et al. |
| 6,565,468 | B2 | 5/2003 | Serkh |
| 6,575,860 | B2 | 6/2003 | Dutil |
| 6,582,332 | B2 | 6/2003 | Serkh |
| 6,609,988 | B1 | 8/2003 | Liu et al. |
| 7,004,863 | B2 | 2/2006 | Serkh et al. |
| 7,144,344 | B2 | 12/2006 | Konanz |
| 7,186,196 | B2 | 3/2007 | Quintus |
| 2003/0216204 | A1 | 11/2003 | Serkh et al. |
| 2004/0235598 | A1 | 11/2004 | Kawasaki et al. |
| 2005/0096168 | A1 | 5/2005 | Serkh et al. |
| 2006/0079360 | A1 | 4/2006 | Jung et al. |
| 2006/0172837 | A1 | 8/2006 | Quintus et al. |
| 2008/0194366 | A1 | 8/2008 | Mevissen et al. |
| 2009/0054186 | A1 | 2/2009 | Stegelmann et al. |
| 2009/0075768 | A1 | 3/2009 | D'Silva |
| 2009/0131208 | A1 | 5/2009 | Hawryluck et al. |
| 2009/0163312 | A1 | 6/2009 | Stegelmann et al. |
| 2009/0181815 | A1 | 7/2009 | Guhr |

FOREIGN PATENT DOCUMENTS

| | | | |
|---|---|---|---|
| DE | 102004047422 A1 | | 4/2006 |
| DE | 102008014325 | | 9/2009 |
| EP | 364277 A1 | | 4/1990 |
| EP | 425246 A1 | | 5/1991 |
| EP | 0 450 620 A1 | | 10/1991 |
| EP | 00450620 B1 | | 10/1991 |
| EP | 536809 B1 | | 4/1993 |
| EP | 546825 A2 | | 6/1993 |
| EP | 361889 B1 | | 10/1993 |
| EP | 575662 A1 | | 12/1993 |
| EP | 0 780 597 A1 | | 6/1997 |
| EP | 0 907 040 A1 | | 4/1999 |
| EP | 00780597 B1 | | 3/2001 |
| EP | 00907040 B1 | | 3/2002 |
| EP | 1398539 | | 3/2004 |
| EP | 1 640 636 A2 | | 3/2006 |
| JP | 2003254399 A | | 9/2002 |
| JP | 2003120768 | | 4/2003 |
| JP | 2003-278864 | | 10/2003 |
| JP | 2003322228 | | 11/2003 |
| JP | 2004270824 | | 9/2004 |
| JP | 2005076672 | | 3/2005 |
| JP | 2005147304 | | 6/2005 |
| JP | 2005299810 A | | 10/2005 |
| JP | 2006029536 | | 2/2006 |
| JP | 2006029537 | | 2/2006 |
| JP | 2006170435 | | 6/2006 |
| JP | 2008032037 | | 2/2008 |
| WO | 0146603 A1 | | 6/2001 |
| WO | WO 02/29279 | | 4/2002 |
| WO | WO 03098071 A1 | | 11/2003 |
| WO | WO 2004/033933 | | 4/2004 |
| WO | WO 2005064201 | | 7/2005 |
| WO | WO 2007/106971 | | 9/2007 |
| WO | 2007113039 A1 | | 10/2007 |
| WO | 2007118625 A1 | | 10/2007 |
| WO | WO 2010037232 | | 4/2010 |

OTHER PUBLICATIONS

Notice of Opposition & Brief by Schaeffler Technologies GmbH & Co. filed in European Patent No. EP 2005029 (Notice of Opposition dated Mar. 30, 2011).

TENSIONER FOR AN ENDLESS DRIVE

The present invention relates to a tensioner for an endless drive, in particular of an internal combustion engine.

A generic tensioner is known from DE 40 10 928 A1. It has a base part with a friction bushing within which a sleeve of a tensioning part is rotatably mounted with a tensioning arm. Between the sleeve and the friction bushing, a bearing bushing is provided.

The tensioning part is clamped with respect to the base part with the help of a spring element designed as a spiral spring, surrounding the friction bushing. A spring bushing is provided between the spiral spring and the friction bushing. If the tensioning part is rotated against the tensioning force of the spring element, the spring element contracts tightly, whereupon it is looped tightly around the spring bushing. In this way it presses the spring bushing tightly against the friction bushing. With the high friction thereby induced between the spring bushing and the friction bushing, the relative rotation of the tensioning part with respect to the base part is damped well. This basic principle has proven successful and is used as the standard. The designs are constantly being improved but the construction of the tensioner is relatively complex.

The object of the present invention is to improve upon a tensioner of the generic type to the extent that a simpler construction is possible with good damping.

This object is achieved according to the present invention with a tensioner having a base part and a tensioning part that is rotatable relative to the base part about a common axis of rotation. A spring such as a helical spring is arranged between the base part and the tensioning part. The spring has a first end and a second end. The first end of the spring abuts a rotary stop provided by the base part and the second end of the spring abuts a rotary stop provided by the tensioning part. The spring is adapted to expand radially in the course of tensioning. A friction device is disposed radially outward of the spring between the base part and the tensioning part. When the spring expands radially outward the spring presses the friction device against the base part or the tensioning part thereby damping the relative movement therebetween.

Good damping can surprisingly be achieved with the friction device arranged radially outside of the spring element. In addition, the radially outer position of the friction device opens up the possibility of implementing a large friction area for a higher measure of damping and/or for a more compact design with a good measure of damping.

Whereas with tensioners of the generic type according to the prior art, the spring element contracts, with the spring element of the present invention, a different type of loading is provided.

The friction device may preferably be in contact with the base part or the tensioning part with a radially outer side. In this way, the friction device has a larger friction area than if it were arranged within the spring element. A greater damping or a more compact design with the same damping is possible with a larger friction area.

The friction device may advantageously be widened in tensioning by the spring element. A greater damping is achieved in this way because due to the widening, the friction area is brought into contact with the respective part more effectively and a greater pressing force is exerted on it. Through the widening, the friction device can effectively transmit the force with which it is widened by the spring element.

The spring element can expand radially in a particularly favorable manner in tensioning. Thus the widening and greater pressure of the friction device against the respective part are accomplished by a change in shape of the spring element.

The friction device may especially advantageously have a supporting bushing on the inside radially against which is friction lining is provided on the outside radially. The supporting bushing carries the friction lining and transmits the forces of the spring element to the friction lining. The supporting bushing may serve to distribute the force if the spring element is in contact with the friction device in only some areas, e.g., when it is designed as a spiral spring.

The friction device may preferably be held against the spring element already in the relaxed state of the spring element. In this way, the friction device retains its intended position against the spring element even in the relaxed state of the spring element. This makes it possible in particular to premount the friction device on the spring element and then to install this unit.

The friction device may advantageously have a holding structure that protrudes radially inward, with which it is held against the spring element in an axial direction.

In this way the axial position of the friction device is secured relative to the spring element. If the spring element is designed as a spiral spring, for example, the holding structure may be designed to be engaged with the spring windings.

A spring end of the spring element pointing in the circumferential direction may advantageously be in contact with a rotational stop of the base part and/or of the tensioning part on the end face. In this way the position of the spring element relative to the base part and/or to the tensioning part is secured in one direction of rotation. Tensioning forces can be transmitted with the rotational stop.

The friction device may preferably be in contact with a rotational stop on the base part or the tensioning part. In this way the position of the frictioning device with respect to the particular part is secured in one direction of rotation. Forces of the friction device due to the damping friction in particular may be absorbed by the rotational stop.

The friction device may preferably be held between the spring element and the rotational stop. Thus the friction device is held by the rotational stop in one direction and by the spring element in the other direction.

The friction device may especially advantageously have a holding protrusion that extends radially and is arranged between the rotational stop and the spring element.

The friction device is held by the rotational stop and/or the spring element with the holding protrusion.

The friction device may preferably have a holding protrusion that extends radially and is in contact with the spring element in the axial direction. The friction device is held against the spring element in the axial direction with the holding protrusion. If the spring element is designed as a spiral spring, for example, the holding protrusion 32 may be in contact with at least one spring winding.

The spring element and the friction device may especially preferably run jointly in an embedding profile of the base part or the tensioning part. The embedding may thus be used for the spring element for the friction device.

The base part or the tensioning part may especially advantageously have an outer bushing which surrounds the friction device and against which the friction device rubs. In this way the outer bushing is utilized to sheath the friction device and has an integrated damping function.

The base part or the tensioning part may advantageously have an outer bushing that surrounds the friction device and the other part respectively may extend around an end section of the outer bushing. This counteracts the penetration of foreign media into the interior of the tensioning device.

An inner bushing of the base part and an inner bushing of the tensioning part may preferably be arranged with an axial distance between them, whereby the inner bushings surround the axis of rotation of the tensioning part. This allows a simple design which can do without an axial bearing between the tensioning part and the base part.

The area on the inside radially between the spring element and the base part and/or the tensioning part may advantageously be an inside clearance. This embodiment does not require additional elements in the aforementioned inner area.

Figure 2:
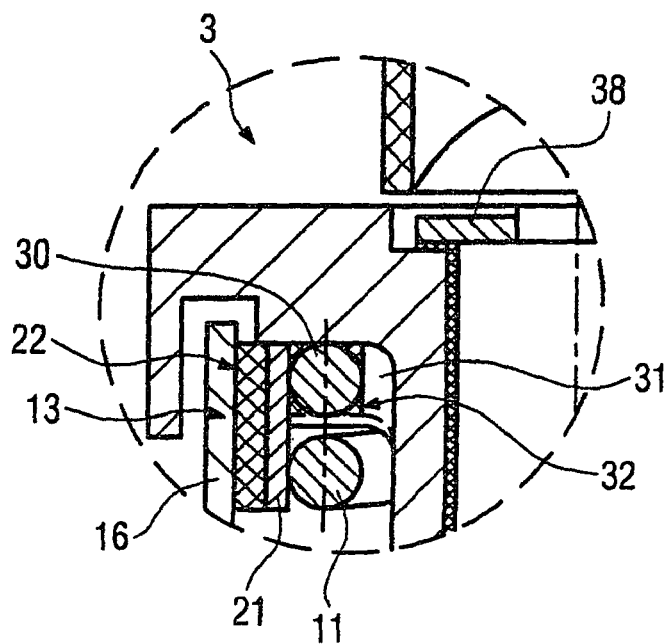
Figure 3:
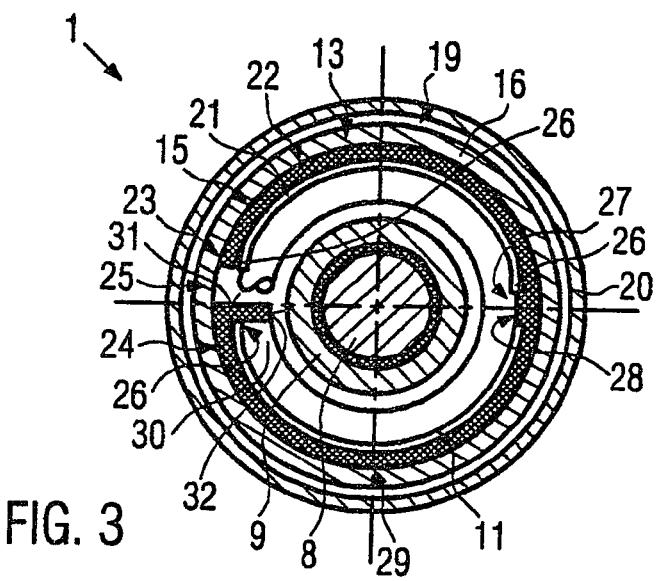
Figure 4:
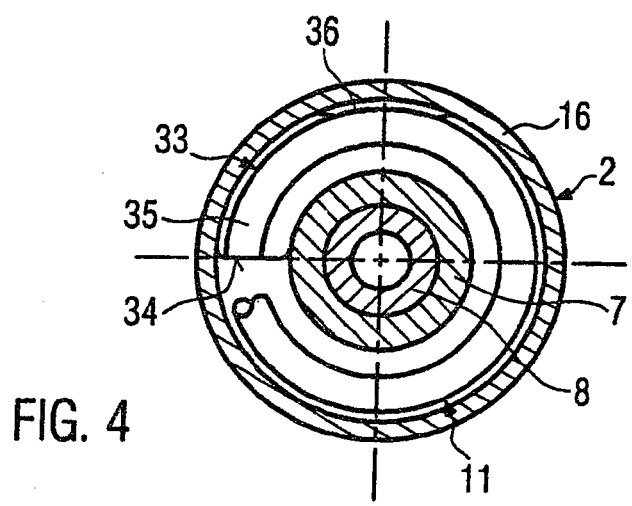
Figure 5:
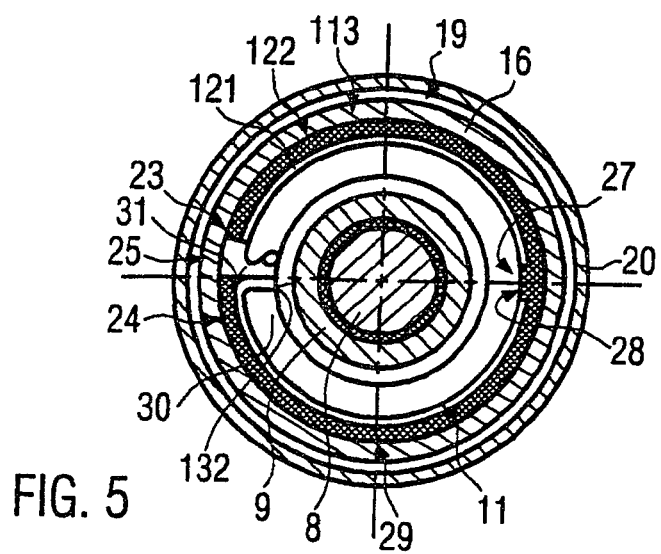

Embodiments of the present invention are illustrated in the figures and described in greater detail below, wherein:

FIG. 1 shows a longitudinal sectional view of a first embodiment of an inventive tensioner, FIG. 2 shows an enlarged view of a detail II from FIG. 1, FIG. 3 shows a cross-sectional view of the tensioner in the manner of a basic diagram approximately according to line III in FIG. 1, FIG. 4 shows a cross-sectional view of a tensioner like a basic diagram according to a line IV in FIG. 1, and FIG. 5 shows a cross-sectional view like a basic diagram of a second embodiment of an inventive tensioner whereby the cross-sectional view is approximately according to line III in FIG. 1.

In the following description of the embodiments of the invention, the same reference numerals are used for the same elements.

FIG. 1 shows a longitudinal sectional view of an embodiment of an inventive tensioner 1. An endless drive, in particular a belt drive of an internal combustion engine, may be put under tension with the tensioner. The tensioner 1 has a base part 2 with which it can be mounted on the internal combustion engine, for example, as well as a tensioning part 3 with a tensioning arm 4 which carries a tension roller 5. The tensioning part 3 is rotatable about an axis 6 relative to the base part 2.

The base part 2 has an internal bushing 7 which is a bearing bushing in this embodiment of the invention and is designed in one piece with the base part 2. A bearing pin 8 is pressed into the bearing bushing 7. The tensioning part 3 has an internal bushing 9 which in this embodiment of the invention is a rotating bushing 9 designed in one piece with the tensioning part. With its rotating bushing 9, the tensioning part 3 is rotatably mounted on the bearing journal 8 such that the rotating bushing 9 and the bearing bushing 7 are an axial distance from one another. A sliding sleeve 10 is provided between the rotating bushing 9 and the bearing journal 8.

A spring element 11 is arranged between the base part 2 and the tensioning part 3 in such a way that it applies a force; in this embodiment of the invention, the spring element is a spiral spring. The spring element 11 surrounds a part of the bearing bushing 7 and the rotating bushing 9, a radially inner area 12 between the spring element 11 and the bearing bushing on the one hand and the rotating bushing 9 on the other hand being an internal clearance. In other words, the area on the inside radially between the spring element 11 and the base part and the tensioning part is an inside distance.

The spring element 11 presses the tensioning part 3 and the base part 2 axially apart. With an axial securing means 38 provided on the bearing journal 8, the tensioning part 3 is held axially on the base part 2. As shown in FIG. 1, the axial securing means in this embodiment of the invention is a disk which is mounted on the bearing journal with a screw bolt.

For damping the relative movement between the base part 2 and the tensioning part 3, the tensioner 1 has a friction device 13 provided between the spring element 11 and the base part 2 or the tensioning part 3. In this embodiment of the invention, the friction device 13 is provided between the base part 2 and a periphery 14 of the spring element 11 on the tensioning part side. The friction device 13 is arranged on the outside radially of the spring element 11 and is in contact with the base part 2 on a radially outer side 15 of the friction device 13.

The friction device 13 extends over approximately 20% to 40% of the axial length of the spring element 11, preferably over approximately one-fourth to one-third of the axial length of the spring element. In this embodiment of the invention, the friction device extends approximately over two windings of the spring element 11.

In this embodiment of the invention, the base part 2 has a cylindrical outer sleeve 16 which surrounds the friction device 13 and against whose inside 17 the friction device 13 is in contact and against which it rubs with a relative movement between the base part and the tensioning part. The cylindrical outer sleeve 16 extends from a base section 18 of the base part 2 of the spring element 11 over its entire length surrounding it in the direction of the tensioning part 3. The tensioning part 3 surrounds an end section 19 of the cylindrical outer sleeve 16, whereby a ring-shaped collar 20 of the tensioning part 3 surrounds the end section 19.

The friction device 13 has on the inside radially a supporting bushing 21 on which a friction lining 22 is provided on the outside radially. The supporting bushing 21 and the friction lining 22 are designed as separate elements.

The supporting bushing 21 consists of a spring elastic material, preferably steel. It may also be made of aluminum. The supporting bushing 21 uniformly distributes the forces of the spring element 11, which is in contact in a line on its interior with its spring windings, to the friction lining 22. The friction lining 22 preferably consists of a plastic material, e.g., a polyamide [nylon], advantageously a modified polyamide 4.6.

Since the friction device 13 is arranged on the spring element 11 on the outside radially, a large friction surface is available on its side 15, which is on the outside radially, in particular in comparison with tensioners, where a friction device is provided on the inside radially of a spring element. With the significantly larger friction surface of the inventive friction device, therefore a much greater damping effect can be achieved or a more compact design can be selected with the same damping, in particular in the radial direction.

The friction device is designed essentially in the form of a ring or cylinder. As indicated in the schematic sectional diagram in FIG. 3, the friction device 13 is interrupted in its circumference, i.e., it has an essentially C-shaped cross-sectional profile. In this way the friction device 13 can be widened so that a slot 25 between its two C ends 23, 24 is enlarged.

The spring element 11 expands radially when put under tension, so that its spring windings expand radially. In this way the friction device 13 is widened and is pressed more strongly against the cylindrical outer sleeve 16 of the base part. In this way the radially outer side 15 of the friction device 13 is brought into more uniform and more effective contact with the cylindrical outer sleeve 16 on its circumference, so that the friction is thus uniformly distributed over the circumference. In addition, the greater pressing force ensures a higher friction moment. Due to the interrupted cross-sectional profile, the radial forces of the spring element are effectively transmitted to the cylindrical outer sleeve.

The inventive tensioner is surprisingly stable in operation despite the spring element widening outward. With generic tensioners of the state of the art, the spring contracts and is supported radially on the inside, in particular by a spring bushing which extends over most of the axial length of the spring. However, the spring element according to the present invention retains adequate dimensional stability without any internal support.

The supporting bushing 21 has holding profiles 26 which protrude radially inward and form a holding structure with which the friction device 13 is held on the spring element 11 in the direction of the axis 6. A holding profile 26 is provided on each C end 23, 24. Another holding profile 26 is formed on the periphery of a passage 27 through the supporting bushing 21. A securing protrusion 28 on the friction lining 22 extends radially inward through the passage 27. This secures the friction lining in its position on the supporting bushing 21 in the rotational direction and in the axial direction.

The holding profiles 26 are preferably produced by the fact that the supporting bushing 21 is bent radially inward at the respective locations. The holding profiles 26 come into contact with the windings of the spring element 11 and thereby secure the friction device in its radial position on the spring element 11. The friction device is also held by the holding profiles against the spring element even in the relaxed state of the spring element.

The spring element 11 is in contact at the end with a rotational stop on the base part and a rotational stop on the tensioning part. This secures the position of the respective end of the spring element with respect to the respective part in a rotational direction and forces can be transmitted between the base part and the tensioning part via the spring element.

The tensioning part 3 has an embedding profile on the sides of the spring element 11, the embedding profile preferably being designed as a spiral groove 29 in which the spring element runs, i.e., at least the end 30 of its last winding on the side of the tensioning part. The aforementioned winding end 30 which is a spring end pointing in the circumferential direction, is in contact with a stop face 31 of the spiral groove 29 running radially outward and in the direction of the axis 6. The stop face 31 defines the end of the spiral groove 29 and is the rotational stop of the tensioning part, as shown in FIGS. 1 and 2.

As the figures also show, the friction device 13 is in contact at the end with a rotational stop of the tensioning part so that the position of the friction device is secured with respect to the tensioning part in one direction of rotation, and the forces due to friction with the cylindrical outer sleeve 16 can be absorbed. In this embodiment of the invention, the spiral groove 29 of the tensioning part 3 is the rotational stop for the friction device, the aforementioned stop face 31. As shown in FIG. 3 in particular, the spring element 11 and the friction device 13 run jointly in the spiral groove 29. The friction device has a shape at the end corresponding to the spiral groove.

On its C end 24 assigned to the aforementioned stop face 31, the friction device has a holding protrusion which extends radially and is arranged between the stop face 31 and the aforementioned winding end 30 of the spring element. In other words, the friction device is held between the spring element 11 and the rotational stop. The spring element is in direct contact with the tensioning part via the holding protrusion.

The holding protrusion is in contact with the spring element in the axial direction in that it is in contact with the next spring winding, as shown by the diagram in FIG. 2. This secures the axial position of the friction device on the spring element 11. With the holding protrusion the friction device is also held on the spring element even in the relaxed state.

By providing the holding protrusion which extends radially, it is possible to secure the friction device and the spring element 11 in one axial direction without having to provide the holding profiles 26.

In this embodiment of the invention, the holding protrusion is a holding strap 32 which is designed in one piece with the friction lining 22 and extends radially inward.

Alternatively, the holding protrusion may also be a holding strap that is designed in one piece with the supporting bushing and extends radially inward. It is also possible to design the holding protrusion as a holding strap which is designed in one piece with the friction lining and with the supporting bushing and extends radially inward.

As indicated in FIGS. 1 and 4, the base part also has an embedding profile designed as a spiral groove on the side of the spring element 11 in this embodiment. The end of the spiral groove is defined by a stop face 34 extending radially outward and in the direction of the axis 6. This stop face 34 forms the rotational stop of the base part 2. At least a part of the last winding of the spring element 11 on the base part runs in the spiral groove 33 of the base part 2. One end 35 of this winding which is a spring end pointing in the circumferential direction, is in contact with the stop face 34.

As shown in FIG. 4, the base part 2 has a supporting protrusion 36 which extends radially inward along a circumferential section, against which the spring element 11, i.e., at least a section of a winding thereof, is in contact. The supporting protrusion 36 supports the spring element 11 across the axis 6.

FIG. 5 shows an inventive tensioner according to a second embodiment of the invention. In contrast with the tensioner 1 of the first embodiment of the invention, this one has a friction device 113 (comprising support bushing 121 and friction lining 122) in which the holding protrusion is a holding strap 132 designed in one piece with the supporting bushing 121 and extending radially inward. Furthermore the friction device 113 does not have the holding profile 26 that is provided with the friction device 13 of the first embodiment.

It is also possible to secure the friction device through a rough surface on its inside in its position on the spring element, in particular with low to moderate damping. To do so, the inside of the supporting bushing may be sandblasted. With the rough surface, the friction device may be held even in the relaxed state of the spring element.

In the exemplary embodiments described here, the friction device 13 surrounds the periphery 14 of the spring element 11 on the tensioning part side. The friction device rests in relation to the tensioning part and rubs against the base part rotating relative to it. However, it is equally possible to reverse this principle and design the tensioner according to the exemplary embodiment already described. The friction device may surround the periphery 37 of the spring element on the base side, i.e., it may rest in relation to the base part and may rub against the tensioning part which moves in relation to it.

The invention claimed is:

1. A tensioner (1) for an endless drive, in particular of an internal combustion engine, having:
    a base part (2) and a tensioning part (3) that is rotatable relative to the base part (2) about a common axis of rotation;
    a spring element (11) arranged between the base part (2) and the tensioning part (3) in a force applying manner, wherein the spring element (11) has a first end (35) and a second end (30), the first end (35) being supported by a rotary stop (34) of the base part (2) and the second end (30) being supported by a rotary stop (31) of the tensioning part (3), wherein the spring element (11) expands radially in the course of tensioning; and a friction device (13) provided between the spring element (11) and the base part (2) or the tensioning part (3), damping the relative movement between the base part (2) and the tensioning part (3), wherein the friction device (13) is arranged radially outside the spring element (11).

2. The tensioner according to claim 1, wherein the friction device (13) is in contact on a radially outer side (15) thereof with the base part or with the tensioning part (2).

3. The tensioner according to claim 2, wherein the friction device (13) has a supporting bushing (21) on the inside radially on which a friction lining (22) is provided on the outside radially.

4. The tensioner according to claim 2, wherein the friction device (13) is widened in tensioning by the spring element (11).

5. The tensioner according to claim 1, wherein the friction device (13) is widened in tensioning by the spring element (11).

6. The tensioner according to claim 1, wherein the friction device (13) is held against the spring element (11) already in a relaxed state of the spring element (11).

7. The tensioner according to claim 1, wherein the friction device (13) has a holding structure (26) protruding radially inward with which it the friction device (13) is held in an axial direction (6) on the spring element (11).

8. The tensioner according to claim 1, wherein each of the first and second ends of the spring element (11) points in a circumferential direction and contacts the rotational stop (34, 31) of the base part (2) or the tensioning part (3).

9. The tensioner according to claim 8, wherein the friction device (13) is held between the spring element (1) and one of the rotational stops (31, 34).

10. The tensioner according to claim 9, wherein the friction device (13) has a holding protrusion (32) extending radially, arranged between one of the rotational stops (31, 34) and the spring element (11).

11. The tensioner according to claim 1, wherein an end of the friction device (13) is in contact with one of the rotational stops (31) of the base part (2) or of the tensioning part (3).

12. The tensioner according to claim 11, wherein the friction device (13) is held between the spring element (1) and one of the rotational stops (31, 34).

13. The tensioner according to claim 12, wherein the friction device (13) has a holding protrusion (32) extending radially, arranged between one of the rotational stops (31, 34) and the spring element (11).

14. The tensioner according to claim 1, wherein the friction device (13) has a holding protrusion (32) that extends radially and is in contact with the spring element (11) in an axial direction (6).

15. The tensioner according to claim 14, wherein the spring element (11) and the friction device (13) run jointly in an embedding profile (29) of the base part or of the tensioning part (2).

16. The tensioner according to claim 15, wherein the base part (2) or the tensioning part (3) has an outer cylindrical sleeve (16) surrounding the friction device (13) against which the friction device (13) rubs.

17. The tensioner according to claim 1, wherein an inner bushing (7) of the base part (2) and an inner bushing (9) of the tensioning part (3) are arranged a distance apart from one another axially, the inner bushings surrounding the axis of rotation (6) of the tensioning part.

18. A tensioner for an endless drive, in particular of an internal combustion engine, said tensioner including:

a base part and a tensioning part that is rotatable relative to said base part about a common axis of rotation;

a helical torsion spring arranged between said base part and said tensioning part, said torsion spring having a first end and a second end, said first spring end abutting a rotary stop provided by said base part and said second spring end abutting a rotary stop provided by said tensioning part, said torsion spring adapted to expand radially in the course of tensioning; and a friction device disposed radially outward of said torsion spring between said base part and said tensioning part, wherein when said torsion spring expands radially outward said torsion spring presses said friction device against one of said base part and said tensioning part thereby damping relative movement between said base part and said tensioning part.

19. A tensioner according to claim 18, wherein said friction device is held from rotating relative to one of said base part or said tensioning part and rubs against the other of said base part or said tensioning part.

20. A tensioner according to claim 19, wherein said friction device is provided in the form of a band having an end that points radially inward, and one of said spring ends pinches said band end against the rotary stop abutted by said friction device.

21. A tensioner according to claim 20, wherein, apart from said inwardly directed band end, said band is radially offset with respect to said helical spring.

22. A tensioner according to claim 21, wherein said band extends axially over approximately 20% to 40% of the axial length of said torsion spring.

23. A tensioner according to claim 19, wherein said friction device is provided in the form of a band that is radially offset with respect to said helical spring.

24. A tensioner according to claim 23, wherein said band extends axially over approximately 20% to 40% of the axial length of said torsion spring.

25. A tensioner according to claim 18, wherein said friction device abuts the rotary stop of said base part or said tensioning part thereby precluding said friction device from rotating relative to the part against which said friction device abuts.

26. A tensioner according to claim 25, wherein said friction device is provided in the form of a band that is radially offset with respect to said helical spring.

27. A tensioner according to claim 26, wherein said band extends axially over approximately 20% to 40% of the axial length of said torsion spring.

28. A tensioner according to claim 18, wherein said friction device is provided in the form of a band that is radially offset with respect to said helical spring.

29. A tensioner according to claim 28, wherein said band extends axially over approximately 20% to 40% of the axial length of said torsion spring.

* * * * *